Aug. 25, 1959     A. R. LINDSAY     2,901,266
AUTOMOBILE CHASSIS OR UNDERFRAME STRUCTURE
Filed June 21, 1954     7 Sheets-Sheet 1
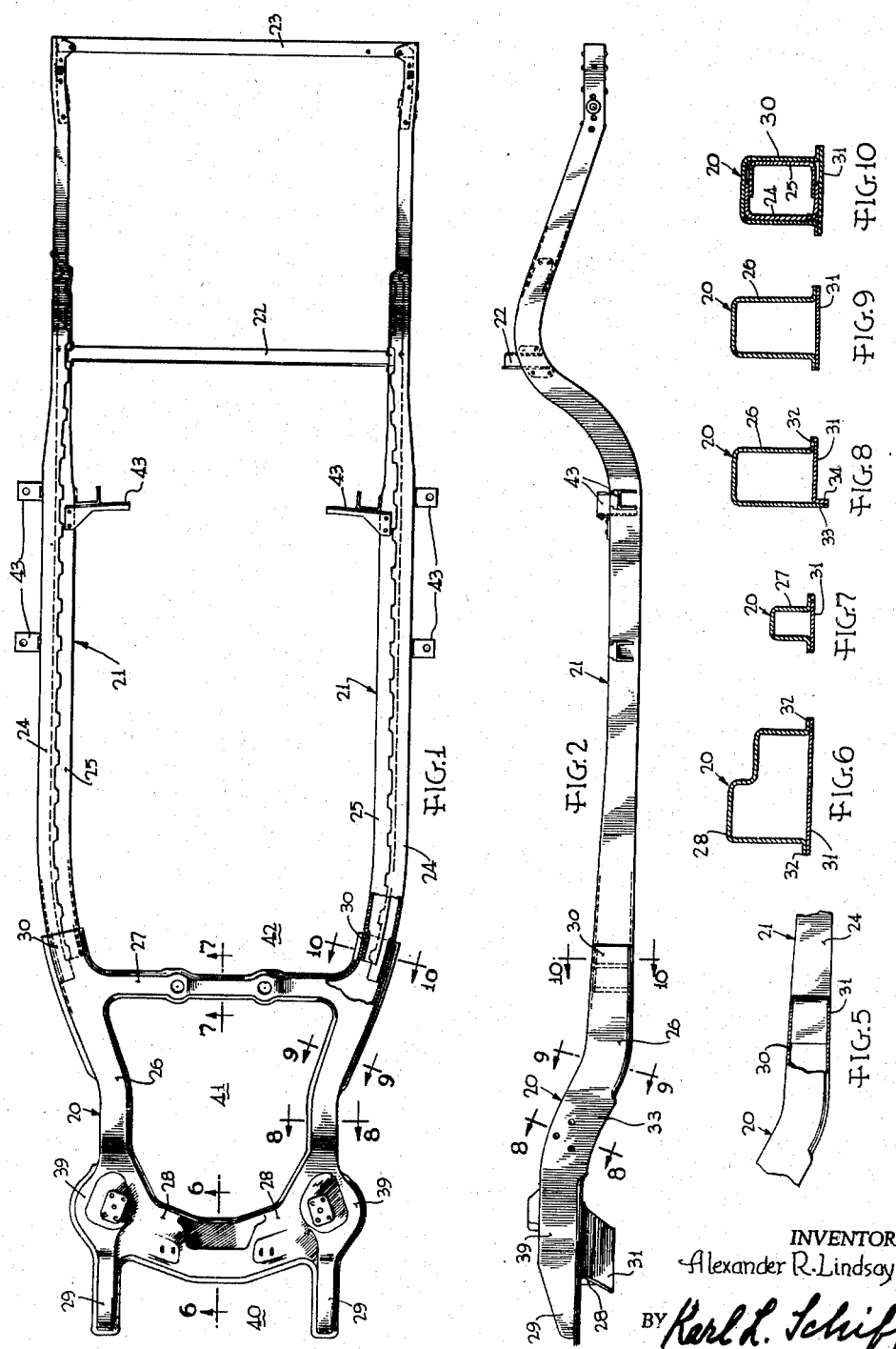
INVENTOR
Alexander R. Lindsay
BY Karl L. Schiff
AGENT

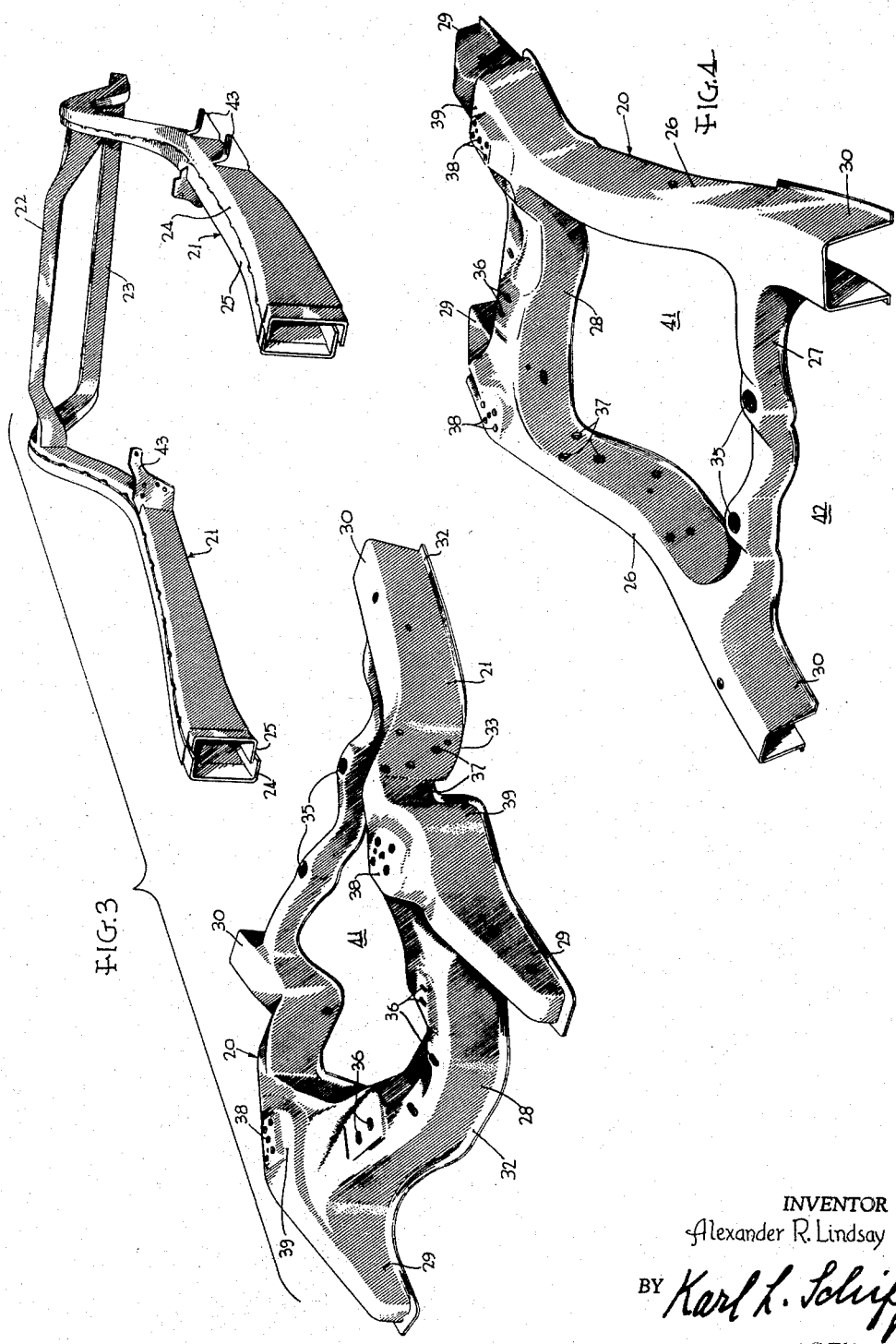

Aug. 25, 1959     A. R. LINDSAY     2,901,266
AUTOMOBILE CHASSIS OR UNDERFRAME STRUCTURE
Filed June 21, 1954     7 Sheets-Sheet 3
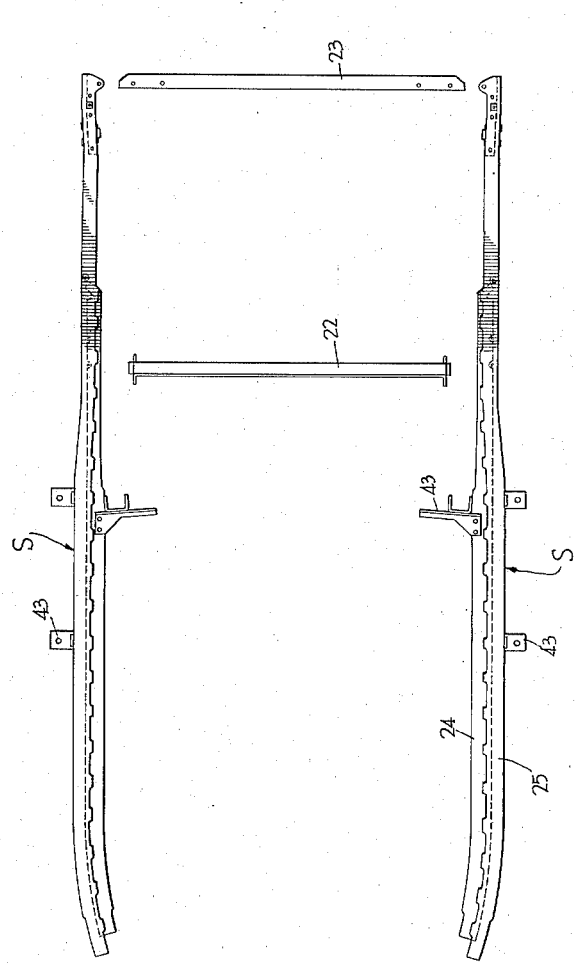
FIG.11
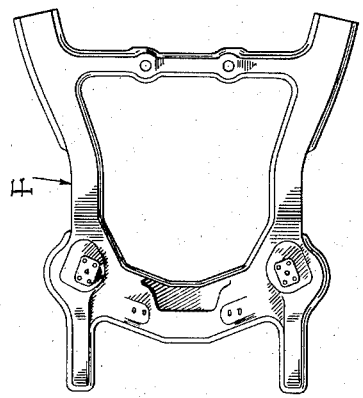
INVENTOR
Alexander R. Lindsay
BY *Karl L. Schiff*
AGENT Aug. 25, 1959     A. R. LINDSAY     2,901,266
AUTOMOBILE CHASSIS OR UNDERFRAME STRUCTURE
Filed June 21, 1954     7 Sheets-Sheet 4

INVENTOR
Alexander R. Lindsay
BY Karl L. Schiff
AGENT

Aug. 25, 1959 A. R. LINDSAY 2,901,266
AUTOMOBILE CHASSIS OR UNDERFRAME STRUCTURE
Filed June 21, 1954 7 Sheets-Sheet 5
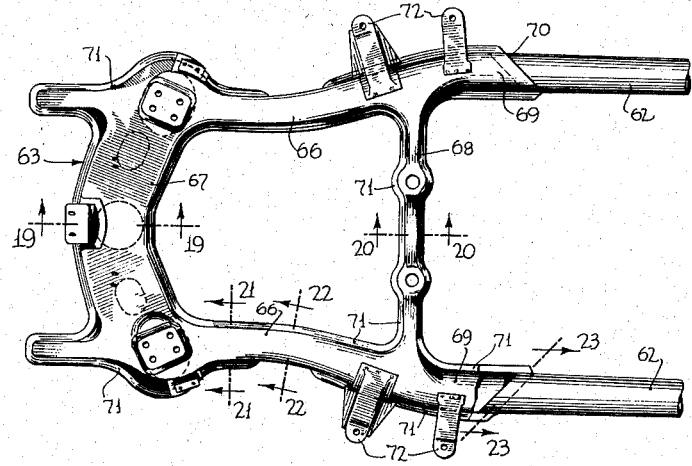
FIG. 16
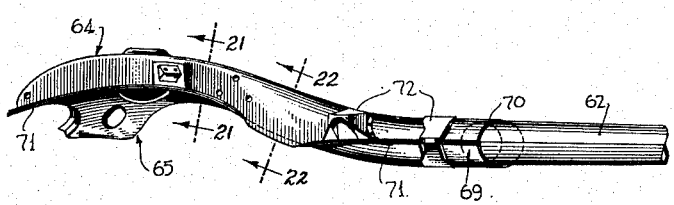
FIG. 17
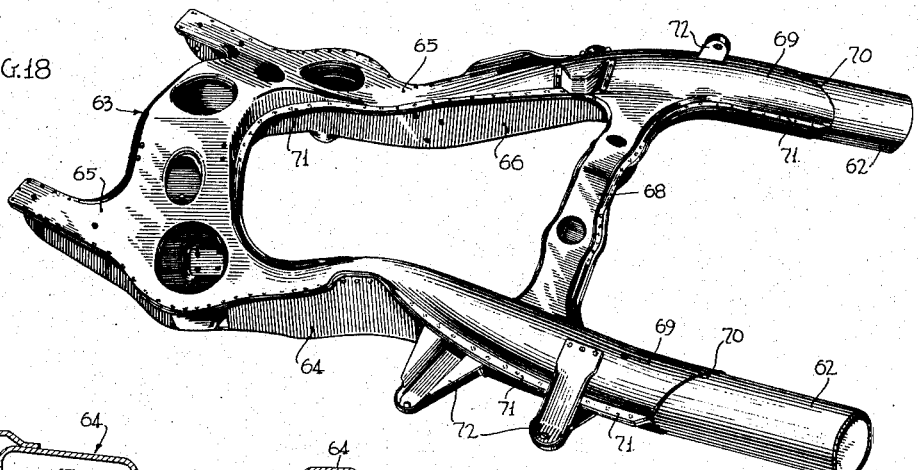
FIG. 18
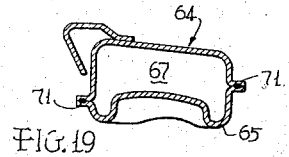
FIG. 19
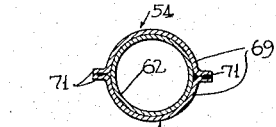
FIG. 23
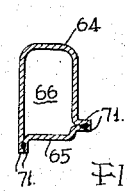
FIG. 21
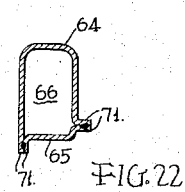
FIG. 20
FIG. 22
INVENTOR
Alexander R. Lindsay.
BY *Karl L. Schiff*
AGENT

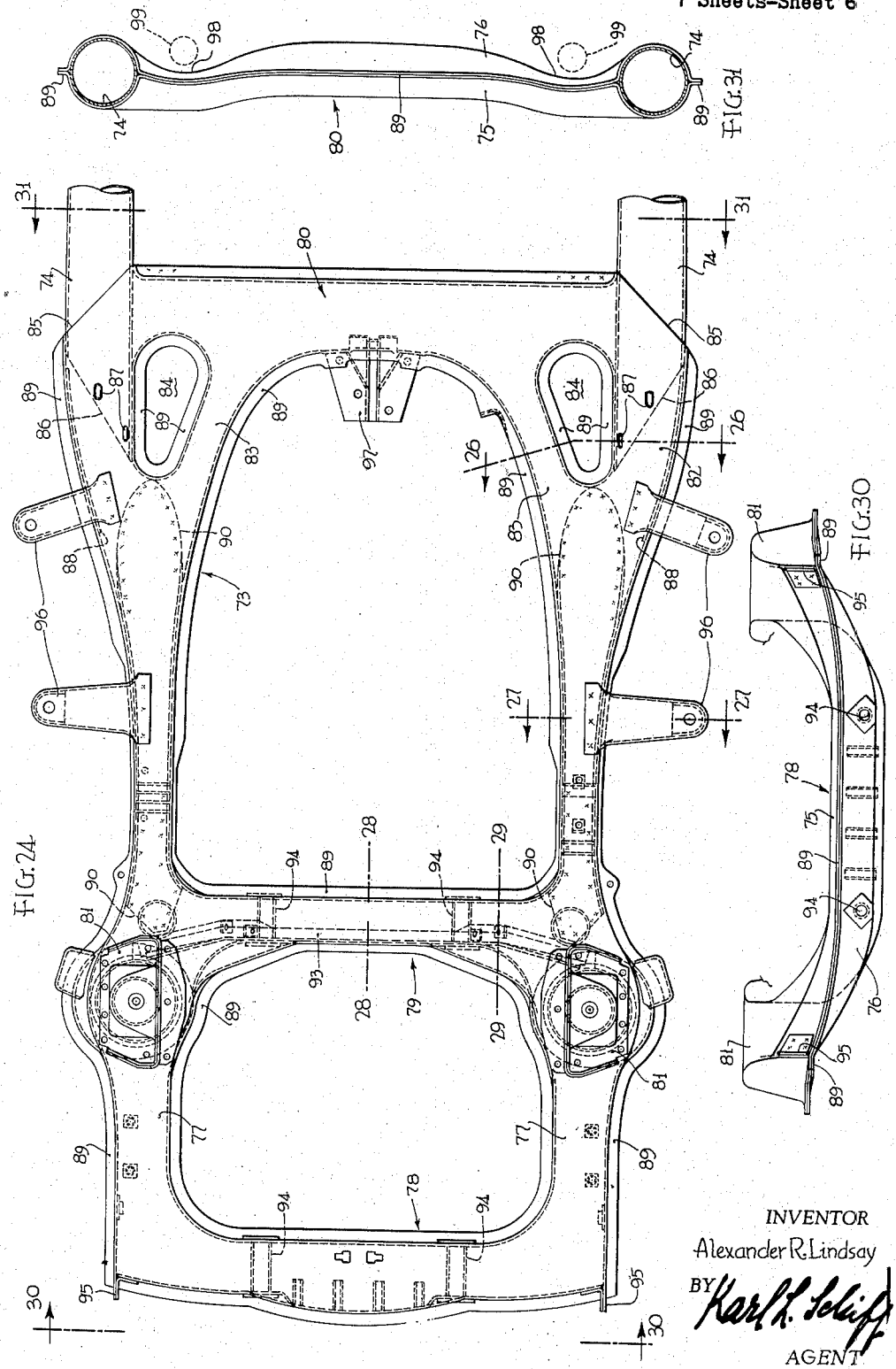

Aug. 25, 1959     A. R. LINDSAY     2,901,266
AUTOMOBILE CHASSIS OR UNDERFRAME STRUCTURE
Filed June 21, 1954     7 Sheets-Sheet 7
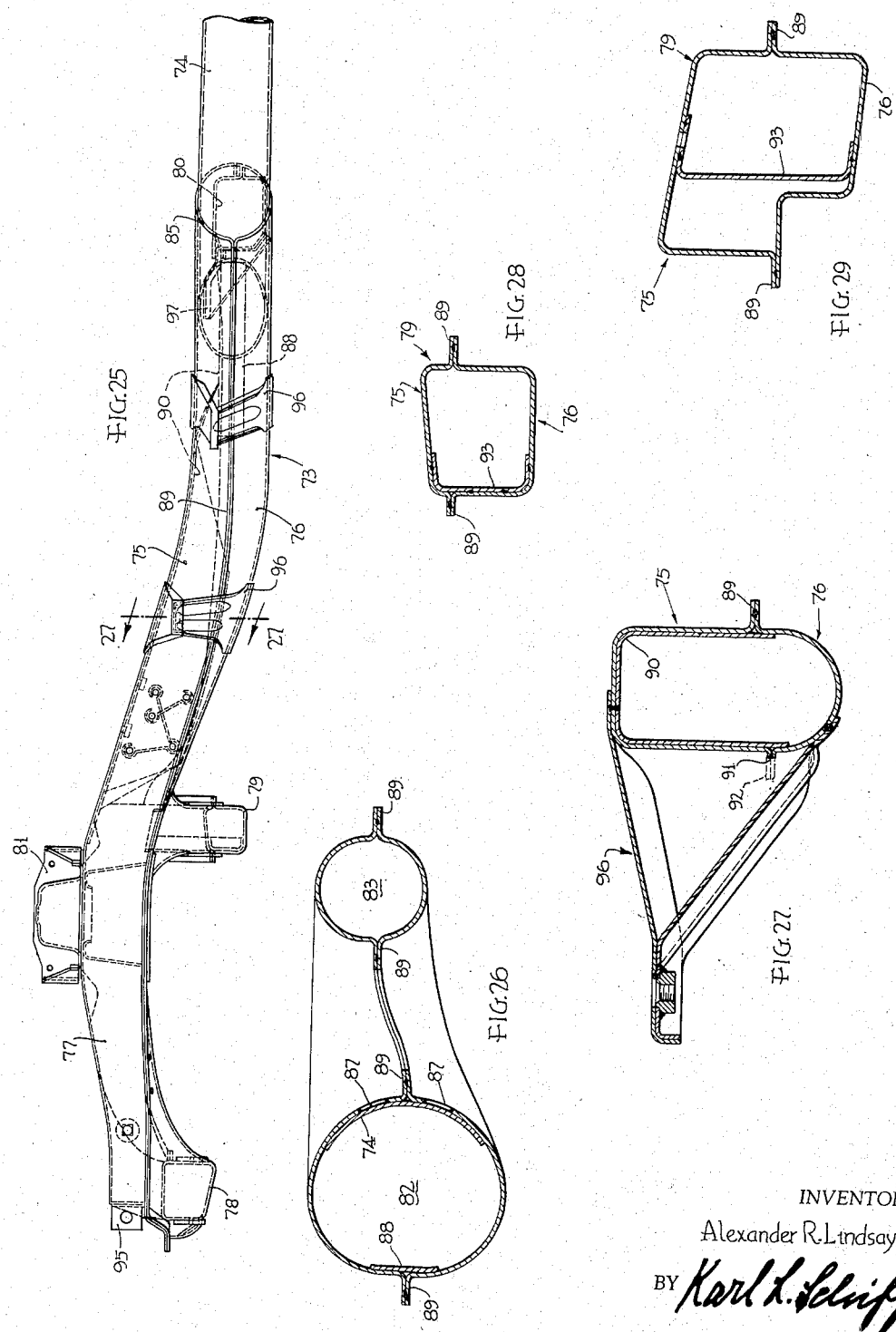
INVENTOR
Alexander R. Lindsay
BY Karl L. Schiff
AGENT

United States Patent Office 2,901,266
Patented Aug. 25, 1959

2,901,266

AUTOMOBILE CHASSIS OR UNDERFRAME STRUCTURE

Alexander R. Lindsay, Glenside, Pa., assignor to The Budd Company, Philadelphia, Pa., a corporation of Pennsylvania Application June 21, 1954, Serial No. 438,144

18 Claims. (Cl. 280—106)

The invention relates to automobile chassis frames or underframe structures of self-supporting bodies. More particularly, the invention relates to the cross beam for supporting the power unit and road wheels.

Among the objects of the invention are: greater simplicity, greater accuracy, more convenient manufacture, and greater strength as compared with known designs of wheel and motor supporting beams.

The invention consists mainly in forming a wheel and motor supporting beam as a mono-piece stamping together with adjoining minor end portions of the side sills while the major portion of the frame is formed by separately manufactured side sill members and cross beams. The mono-piece stamping includes preferably also a second motor support in the form of inward projections or in the form of a second cross member. Furthermore, the channel sections of the mono-piece stamping are preferably closed by a substantially plane bottom plate.

The invention has great advantages over those known structures in which the entire chassis or underframe or the major portion thereof is formed as a mono-piece stamping, because they require very large sheet metal blanks and correspondingly large presses without attaining the important advantages achieved by the invention. The invention restricts the mono-piece stamping to one end and a minor portion of the frame structure—an end portion which in the known structures mostly consists of several pieces even where the major portion of the underframe comprises a mono-piece stamping.

The invention will be more clearly and fully understood from the embodiments illustrated in the attached drawing and from the following description thereof.

In the drawing:

Fig. 1 is a plan view of a chassis frame in accordance with one form of the invention;

Fig. 2 is a side elevation of the same frame;

Fig. 3 is an exploded fragmentary three-quarter front perspective, on a larger scale, of the same frame;

Fig. 4 is a three-quarter rear perspective of the front stamping of the frame;

Fig. 5 is a fragmentary side elevation, partly in section, of the joint between one side sill and the front structure;

Figs. 6 through 10 are fragmentary sections along the correspondingly numbered lines of Figs. 1 and 2, respectively;

Fig. 11 is an exploded view of the frame per Fig. 1 showing the different main sub-assemblies;

Fig. 16 is a plan view of another form of the front end unit and of adjoining main side sills;

Fig. 17 is the side elevation to Fig. 16;

Fig. 18 is a three-quarter rear underside perspective of the structures shown in Figs. 16 and 17;

Figs. 19 to 23 are fragmentary sections on a larger scale along the correspondingly numbered section lines of Figs. 16 and 17;

Fig. 24 is a plan view of a still further modification of the front structure and of adjoining main side sill;

Fig. 25 is a side elevation to Fig. 24; and

Figs. 26 to 31 are fragmentary sections on a larger scale and end elevations, respectively, taken along the lines and seen in the directions of the correspondingly numbered arrows in Figs. 24 and 25.

Figure 12:
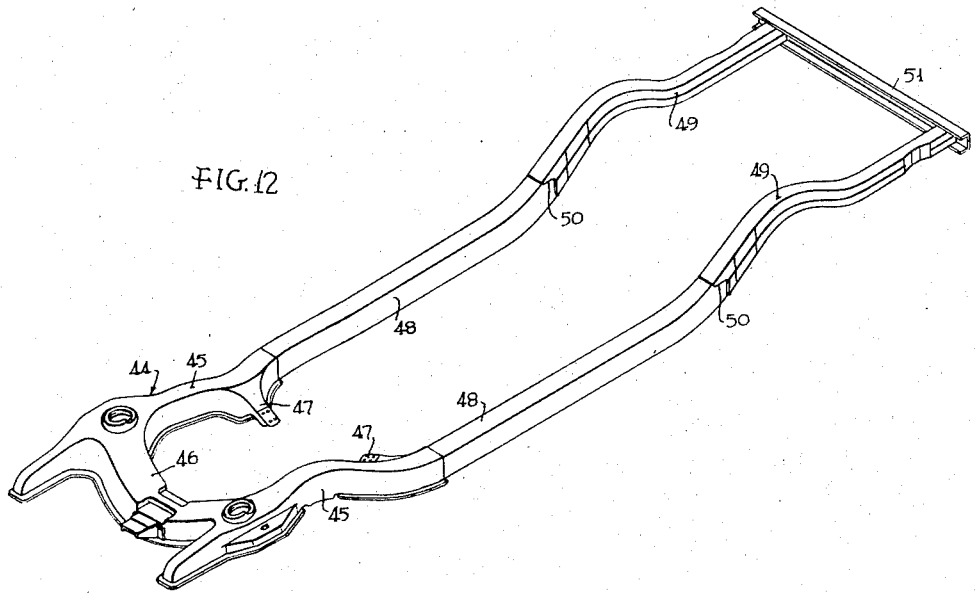
Fig. 12 is a small scale perspective of a chassis frame in accordance with another form of the invention.

The present application is a continuation-in-part of applicant's co-pending application Serial No. 358,315, filed on May 29, 1953 under the same title and now abandoned.

The chassis frame illustrated in Fig. 1 comprises a front structure including a mono-piece stamping 20 and adjoined by a pair of separate side sills 21, which latter are interconnected in the rear region by separate cross beams 22, 23.

The side sills 21 may consist of two channel sections 24, 25 facing each other and having their side walls overlappingly arc-welded to each other.

The mono-piece stamping 20 is throughout of downwardly facing channel section. It has side sill portions 26 interconnected near their rear ends by a rear motor supporting cross beam 27 and near the front by a wheel supporting and forward motor supporting cross beam 28. Forward side sill extensions 29 are adapted for the securement of bumper supports (not shown). The side sill portions 26 extend rearwardly beyond transverse beam 27 to form short horns 30 telescopingly receiving the front ends of the sills 21.

The outer ends of beam or beams 27, 28 bridge the space between sill portions 26, 29, 30 and thereby constitute themselves minor parts of the sills.

Stamping 20 is closed at the bottom by a bottom wall 31, which is connected, preferably spot welded, to marginal flanges 32 of the channel sections. In the region of the turn-in of the rear part of the steering wheels (not shown), the respective side wall of the channel section is extended downwardly at 33 and bottom wall 31 has a flange 34 overlapping the extension 33 so as to increase the space available for the steering movement of the wheel.

Stamping 20 is provided with holes and attachment surfaces 35, 36, 37 and 38, respectively, for the rear and front support of the power unit (not shown), for the steering gear (not shown) and for wheel supporting springs and levers (not shown). Side sill members 26 and cross beam 28 form at their juncture hollow cylindrical portions 39 for the reception of the upper ends of the wheel supporting coil springs (not shown) entering through openings provided in bottom plate 31.

In its interior, the stamping 20 may be reinforced at appropriate locations by brackets, gussets and transverse bulkheads, all of which are not shown.

The mono-piece stamping 20 can be formed with relatively little loss of material to be cut out in the regions 40, 41, 42 (Figs. 1 and 4) surrounded by its different frame members. All attachment surfaces, connecting holes, etc. for wheels, motors, steering gear, etc. can be much more accurately formed in regard to their relative locations than is the case with customary constructions, where the wheel supporting beam is made separate from the side sills and then secured to them.

The assembly may be done in the following sequence: The sill members 24, 25 are connected with each other and with cross members 22, 23 as well as with necessary additional brackets 43. This preassembled rear end structure is then secured by spot welding and/or fusion welding in the interior of the open channel section horns 30 of stamping 20. After completion of this connection, stamping 20 is closed by plate 31 by spot welding the margins of plate 31 to flanges or extensions 32, 33 of stamping 20. For increased strength and for avoidance of stress concentrations, the two members 24, 25 of the side sills may end at different points, as shown in the drawing, or the rear margins of the horns 30 may be inclined to the longitudinal direction of the underframe.

For economical, convenient and compact shipping purposes, the units shown in Fig. 11 may also be preassembled at the manufacturing plant and shipped to the final assembly plant where they are connected with each other into the frame per Fig. 1. The sub-assembly units are the front unit F composed of the stampings 20 and 31, the main side sills S each composed of the sill members 24, 25 with or without brackets 43, and the individual cross members 22 and 23.

The embodiment illustrated in Fig. 12 has a one-piece front stamping 44 forming the front portions 45 of the side sills, the forward motor and front wheel supporting transverse beam 46, and inwardly directed projections or horns 47 for the rear support of the power unit. Mono-piece stamping 44 is adjoined by side sill members 48 which may consist of a square tube, and by further side sill members 49. The members 49 each consist of an upper and a lower channel section welded together along their meeting lines, are spliced at 50 to members 48, and are transversely interconnected by rear cross beam 51.

Figure 13:
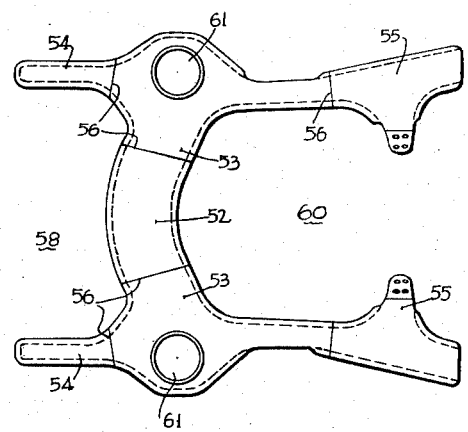
Fig. 13 is a larger scale bottom view of the front end structure shown in Fig. 12.

The cross section of stamping 44 is a channel throughout closed by a bottom plate consisting of several individual pieces 52, 53, 54, 55 joined together along the lines 56, as shown in Fig. 13. Cross section of stamping 44 and its connection with the bottom plate are similar to the first embodiment.

Figure 14:
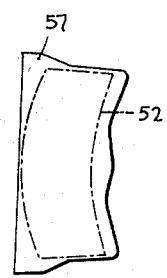
Figs. 14 and 15 show the use of the cut-outs obtained from the manufacture of the mono-piece stamping shown in Fig. 12 for producing, respectively, a large part of the bottom plate closing the opening of the mono-piece stamping.

Fig. 14 illustrates the piece of material 57 cut out from the blank for forming stamping 44 in the region 58 defined by cross member 46 and the forward extensions of side sill portions 45. This piece 57 is used for forming bottom plate member 52 as indicated in dot-and-dash lines in Fig. 14.

Figure 15:
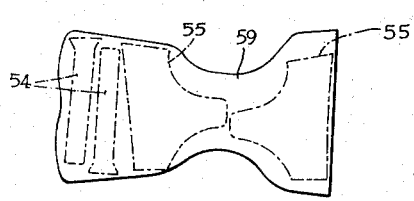

Fig. 15 illustrates the piece of material 59 cut out from the blank for forming stamping 44 in the region 60 defined by cross member 46 and side sill portions 45. As shown by the dot-and-dash line, this material is used for producing both pairs of bottom plate stampings 54, 55, leaving only the bottom plate stampings 53 to be formed of additional material.

Parts 53 of the bottom plate show holes 61 for the passage of wheel supporting springs (not shown). Corresponding holes are mentioned hereinbefore in describing bottom plate 31 of the first embodiment.

The embodiment illustrated in Figs. 16 to 23 is designed for tubular main chassis sills 62 which are preferably of the type disclosed in the application of Walter B. Dean for "Chassis Frame with Tubular Side Sills for Automobiles," Serial No. 437,966, filed on June 21, 1954.

In this embodiment the mono-piece front end structure 63 comprises an upper stamping 64 and a lower stamping 65 forming together side sill portions 66, a forward cross beam 67 and a rearward cross beam 68. Sill portions 66 form short horns 69 extending rearwardly beyond beam 68. So as to facilitate the forming of the stampings 64 and 65, both of them present channel sections and participate in the formation of the depth of the box sectional members 66 to 69, as shown particularly in the cross sectional Figs. 19 to 23. This is one of the important deviations of this embodiment from the embodiments disclosed in Figs. 1 to 15.

Another difference of this embodiment resides in the circular cross section of the horns 69 which gradually merge into the rectangular cross section of the side sill portions 66 as shown in Figs. 21 and 22. One half of each horn 69 is formed on each of the upper and lower stampings and the inner diameter is such as to receive the forward ends of the main sills 62. Horns 69 and sills 62 are rigidly and permanently connected with each other by appropriate means such as by fusion welds along line 70.

As in the preceding embodiment the stampings 64 and 65 are connected with each other along the overlapping margins 71, and the front unit is provided with body supporting brackets 72 and other customary or desirable brackets and accessories.

Fig. 16 diagrammatically illustrates a way for overcoming what might otherwise be considered a serious drawback of the new structure.

In customary chassis frames having two full-length side sills interconnected by a plurality of separately-made cross beams, it is easy to arrange at any desirable location the cross beam presenting the rear support for the power unit, i.e. the beam corresponding to cross beam 68 of Fig. 16. Different locations are often desirable because the same type of car is often available with different types of motors, clutch and/or gear, in which case the length of the power unit and the distance between its forward and rearward supporting points is mostly different and has to be taken care of by a corresponding change in the location of the rear cross beam in question.

It would seem that the solution of this problem for a mono-piece front unit made coresponding to the invention would require a corresponding number of sets of forming dies, one set for each of the different required locations of the cross beam 68. Such dies are very expensive.

According to a further feature of the invention the problem is solved by using the same set of dies giving the same basic form to all stampings in regard to the side sill portions 66, the form and location of forward cross beam 67 as well as the form but not the location of the cross beam 68, and by permitting change of the location of cross beam 68 in making that part of the die (not shown) which forms the cross member 68 movable to different locations with respect to the remaining main portion of the die. In this manner one set of dies forms either the front unit as shown in full lines in Fig. 16 or a unit in which the location of the rear cross beam 68 is shifted to a different location.

The embodiment illustrated in Figs. 24 to 31 has a mono-piece end unit 73 connected, as in the last preceding embodiment with tubular main side sills 74. Unit 73 is mainly formed of an upper mono-piece stamping 75 and a lower mono-piece stamping 76. These stampings form side sill portions 77 and three cross beams, a front cross beam 78, a middle cross beam 79 and a rear cross beam 80. The front and rear cross beams 78 and 80 present the supports for the power unit (not shown) whereas middle beam 79 has its center portion downwardly offset so as to extend beneath the power unit and interconnects the front spring (not shown) supporting regions 81.

The connecting zone between front unit 73 and main side wall 74 is greatly strengthened by the formation best shown in Figs. 24 and 26. The side sill portions 77 are in this rear region bifurcated into an outer branch 82 and an inner branch 83, both of which merge into and communicate with rear cross member 80. The three components 80, 82, 83 surround on each side of the frame a small, about triangular opening 84. This formation not only strengthens the structure but also decreases its weight. Each of the two branches 82 and 83 is, as shown in Fig. 26, a closed box section and is otherwise formed partly on the upper and partly on the lower stamping of the front unit in the same manner as the remainder of the sill and cross beam portions thereof.

Front unit 73 has in this embodiment no horns extending rearwardly beyond rear cross member 80 but has the outer side sill branches 82 terminated by an inwardly and rearwardly converging margin 85. Front margin 86 of main sill 74 is oppositely inclined as shown in Fig. 24. The connection between the two is obtained by fusion welding along margin 85 and by hole or plug welds 87, some of which can be arranged on the inside of branch tube 82 near its center plane.

The outer wall of branch 82 is reinforced in front of tube 74 by gusset 88 (Fig. 26) extending across the connection between the connecting flanges 89 of the two stampings and spot welded to them by reaching into the interior of the tube portion 82 prior to the insertion of main sill 74.

The side sill portions 74 are furthermore reinforced in the region between the bifurcations 82, 83 and middle cross member 79 by a downwardly facing channel section 90 spot welded, as indicated in Fig. 27, to the upper stamping 75, the insertion and the welding being done of course before the assembly of the stampings 75 and 76 with each other. The reinforcement 90 extends across the division between the two stampings.

Deviating from the preceding embodiments there are no down-turned flanges in the zone of the wheel turn-ins. Instead thereof the meeting margins of the stampings 75 and 76 are connected with each other and the underlying outer wall of reinforcement 90 by fusion weld 91. This weld is preferably obtained by originally providing in these zones narrow flanges 92 on the two stampings, which are then melted down such as by an electric arc.

Cross member 79 is interiorly reinforced and the two wheel attachment zones 81 are additionally tied together by a rearwardly facing channel section 93 nested in the interior of member 79 and spot welded to lower stamping 76 prior to its assembly with upper stamping 75 (Figs. 24, 28 and 29). This reinforcement 93 also serves for the attachment of other, not shown, accessories.

Bushings 94 on cross members 78 and 79 serve for the attachment of (not shown) wheel guiding links, and 95 are brackets for the attachment of the front bumper (not shown). Other bushings, brackets and special formations are provided for the attachment or accommodation of customary accessories or for providing the necessary space for them; among such parts and formations are body supporting brackets 96, rear motor supporting bracket 97 and offset 98 of cross member 80 for the passage of exhaust pipe 99.

It will be noted that in all embodiments the corners between the longitudinal and transverse portions of the mono-piece stamping are generously rounded so as to facilitate the formation of the stampings by die drawing and so as to increase the strength and the rigidity.

While a few embodiments of the invention are shown and described, it will be understood that the invention is not restricted to these embodiments or to the details thereof, but is adaptable to the specific layout of the chassis frame to be produced, to the distance and the width of the motor attachment points, to the type of wheel suspension intended to be used, and to the characteristics of the adjoining structure of the chassis frame or the combined body and chassis structure.

The invention is, for instance, not necessarily restricted to the formation of the front end structure of a single mono-piece stamping but several alternative designs are conceivable incorporating essential parts of the invention and of its advantages. Instead of a single mono-piece stamping there might for instance be formed two stampings each comprising the joinder between one side sill and one or more motor and wheel supporting cross beams; or a mono-piece stamping may comprise the entire wheel and motor supporting cross beam with short length of the adjoining side sill structures. In this connection it should be understood that the former constructions were particularly complicated in the region and on account of the joinder of side sills and cross beam, i.e., in the very region where provisions have to be made for the attachment of the wheel guiding and supporting means.

It should also be understood that the invention is not restricted to the illustrated, though mostly preferable, cross sectional forms of the mono-piece stamping.

It will still further be understood that the invention is not necessarily restricted to the front end of the underframe but that, particularly in the case of the arrangement of the motor at the rear end of the car, the invention may be employed at the rear end.

Other examples of possible modifications are the longitudinal extent of the side sill members and the extent of the formation of brackets and other attachment means on the mono-piece stamping.

What is claimed is:

1. In an underframe structure for automobiles, a pair of longitudinal side sills interconnected by transverse means, one of said transverse beams comprising a mono-piece stamping extending over the entire width of the underframe and having formed thereon minor portions only of the length of said side sills, said sill portions extending fore and aft from said beam, the outer ends of said beam bridging the space between said sill portions and thereby constituting themselves minor parts of the sills, the regions of said stamping where said beam and said sill portions meet being shaped and designed for the attachment of wheel guiding means and being formed into a downwardly open housings for the reception of the upper ends of generally cylindrical upright supporting springs, one of said sill portions being connected with adjoining main side sill members which are separate from each other and from said stamping and which constitute the major portion of the length of said side sills.

2. Underframe structure according to claim 1, having said mono-piece stamping of channel-section and closed by a substantially flat bottom plate.

3. Underframe structure according to claim 1, having said mono-piece stamping of channel-section and closed by a substantially flat bottom plate formed of several pieces.

4. In an underframe structure for automobiles, a pair of longitudinal side sills interconnected by transverse beams, one of said transverse beams comprising two mono-piece stampings extending over the entire width of the underframe and having formed thereon minor portions of said side sills extending fore and aft from said one beam, said mono-piece stampings being shaped and designed in the region where said one beam and said sill portions meet for the attachment of wheel guiding means and being formed into a downwardly open housings for the reception of the upper ends of generally cylindrical upright supporting springs, said mono-piece stampings being hollow sections connected with each other into closed box sections, said sill portions being connected with adjoining main side sill members which are separate from each other and from said stamping and which constitute the major portion of the length of said side sills.

5. In an underframe structure for automobiles, a pair of longitudinal side sills interconnected by transverse beams, one of said transverse beams being shaped and designed for the attachment of wheel guiding means and of one power unit support, the ends of said last-named beam being formed into downwardly open housings for the reception of the upper ends of generally upright cylindrical springs, said last-named beam comprising a mono-piece stamping extending over the entire width of the underframe and having formed thereon minor portions of the length of said side sills, said sill portions being connected with adjoining separate main side sill members constituting the major portion of the length of said side sills.

6. In an underframe structure for automobiles, a pair of longitudinal side sills interconnected by transverse beams, one of said transverse beams being shaped and designed for the attachment of wheel guiding means and one power unit support and being formed into housings for generally upright cylindrical springs, and a second transverse beam providing a second power unit support, said two last named beams comprising a mono-piece stamping extending over the entire width of the underframe and having formed thereon minor portions of said side sills between them, said sill portions being connected with a pair of adjoining separate main side sill members constituting the major portion of the length of said side sills.

7. Underframe according to claim 6, in which said sill portions end at said second transverse beam.

8. Underframe according to claim 6, in which said main side sill members extend longitudinally across and close the ends of said second transverse beam.

9. In an underframe structure for automobiles, a pair of longitudinal side sills interconnected by a plurality of transverse beams; a pair of said beams comprising a mono-piece stamping extending over the entire width of the underframe and having formed thereon minor portions of said side sills between them, said mono-piece stamping presenting attachments for wheel guiding means and power unit supports and widened ends formed as supports for the upper ends of upright compression springs, separately made main side sill members constituting the major portion of the length of said side sills, and at least one additional separately made transverse beam interconnecting said main sill members; said mono-piece stamping, said main sill members, and said separate transverse beam each belonging to a separate unit shippable independently of the other units.

10. In an underframe structure for automobiles, a pair of longitudinal side sills interconnected by transverse beams, one of said transverse beams being shaped and designed for the attachment of wheel guiding means and of one power unit support and widened ends formed as supports for the upper ends of upright compression springs, said last-named beam comprising a mono-piece stamping extending over the entire width of the underframe and having formed thereon minor portions of said side sills and a second power unit support, said sill portions being connected with adjoining separate main side sill members constituting a major portion of the length of said side sills.

11. A transverse beam for automobile underframes, shaped and designed for the attachment of wheel guiding means and being formed into a downwardly open housings for the reception of the upper ends of generally cylindrical upright supporting springs, comprising a mono-piece sheet metal stamping of channel-section extending over the entire width of the underframe and having formed thereon minor portions of adjoining longitudinal side sills, said sill portions extending longitudinally in both directions from said beam, at least some of said portions being formed as connecting means with individual main side sill members.

12. Mono-piece stamping for automobile underframes comprising at least one end portion of a transverse beam, shaped and designed for the attachment of wheel guiding means and having a widened outer portion for receiving the upper end of a vertical supporting coil spring, and a minor portion of an adjoining longitudinal side sill formed as connecting means with a separate main portion of such side sill.

13. Mono-piece sheet metal stamping for automobile underframes comprising at least one end portion of a transverse beam presenting attachment means for wheel guiding means and being formed into downwardly open housings for the reception of the upper ends of generally cylindrical upright supporting springs, and minor portions of an adjoining longitudinal side sill, said portions extending fore and aft beyond said beam, one of said side sill portions being formed as connecting means with a separate main side sill member, and the other one of said side sill portions as attachment means for a bumper support.

14. In an underframe structure for automobiles, a pair of longitudinal side sills interconnected by transverse beams, at least one of said transverse beams together with minor portions of said side sills being formed as parts of a mono-piece stamping extending over the entire width of the underframe, said sill portions being bifurcated at their joinder with said one transverse beam, said sill portions being connected with adjoining separate main side sill members constituting a major part of the length of the side sills.

15. In an underframe structure for automobiles, a pair of longitudinal side sills interconnected by transverse beams, at least one of said transverse beams comprising a mono-piece stamping extending over the entire width of the underframe and having formed thereon minor portions of said side sills, said sill portions being connected with adjoining separate side sill members constituting a major part of the length of the side sills, said sill portions being hat-sections having marginal flanges connected with a closing member, said flanges being omitted over part of the length of said sill portions and replaced by fusion welds connecting said stamping and closing member.

16. End structure for automobile underframes, shaped and designed for the attachment of wheel guiding means and supporting springs, comprising a mono-piece sheet metal stamping of channel-section extending over the entire width of the underframe and having formed thereon longitudinally spaced transverse beams and minor portions of longitudinal side sills between them, a reinforcing stamping nested in and secured in said channel section, said sill portions being formed as connecting means with individual, separately made main side sill members.

17. In an underframe structure for automobiles having a pair of longitudinal side sills interconnected by transverse beams, and end structure comprising two mono-piece, hollow-section stampings extending over the entire width of the underframe and having formed thereon at least one transverse beam and minor portions of the side sills, said mono-piece stampings having zones shaped and designed for the attachment of wheel guiding means and supporting springs, said mono-piece hollow section stampings being connected with each other into a closed box section, a reinforcing stamping secured in said hollow section of said transverse beam and interconnecting opposite ones of said zones, said sill portions being connected with adjoining separate side sill members constituting the major parts of the length of the side sills.

18. End structure for automobile underframes, comprising a pair of mono-piece stampings connected with each other and forming minor portions of side sills, said sill portions being designed for connection with adjoining separate main side sill members, said sill portions being hat-sections having marginal flanges connected with each other, a reinforcing channel section nested in and secured to the walls of one of said hat-sections, said reinforcing channel having marginal portions extended across the juncture of said flanges and into the other one of said hat-sections.

References Cited in the file of this patent

UNITED STATES PATENTS

| Re. 18,750 | Tarbox | Feb. 28, 1933 |
|---|---|---|
| 1,478,373 | Belden | Dec. 25, 1923 |
| 2,072,044 | Widman | Feb. 23, 1937 |
| 2,119,193 | Avery | May 31, 1938 |
| 2,127,553 | Dietrich | Aug. 23, 1938 |
| 2,611,627 | Reynolds | Sept. 23, 1952 |